United States Patent [19]

Jones

[11] Patent Number: 4,556,093

[45] Date of Patent: Dec. 3, 1985

[54] AUTOMATIC SHUTOFF DEVICE

[76] Inventor: William E. M. Jones, 11 Jackladder Cir., Horsham, Pa. 19044

[21] Appl. No.: 582,034

[22] Filed: Feb. 21, 1984

[51] Int. Cl.⁴ .............................................. B65B 1/30
[52] U.S. Cl. .................................... 141/206; 141/198; 141/392; 141/214
[58] Field of Search .............................. 141/206–229, 141/198, 192, 392

[56] References Cited

U.S. PATENT DOCUMENTS

| | | | |
|---|---|---|---|
| 2,073,360 | 3/1937 | Bickley | 141/210 X |
| 2,111,852 | 3/1938 | Flinchbaugh | 141/215 |
| 2,326,251 | 8/1943 | Piquerez | 141/225 |
| 2,330,704 | 9/1943 | Grise | 141/214 |
| 2,527,760 | 10/1950 | Piquerez | 141/206 |
| 2,597,402 | 5/1952 | Sweeny et al. | 141/211 |
| 2,703,195 | 3/1955 | Froidevaux | 141/215 |
| 2,869,593 | 1/1959 | Zieg | 141/208 |

FOREIGN PATENT DOCUMENTS 727639 4/1955 United Kingdom ................ 141/206

*Primary Examiner*—Stephen Marcus
*Assistant Examiner*—Ernest G. Cusick

[57] ABSTRACT

An automatic shutoff device of the type which makes use of a venturi to terminate the flow of a liquid into a container when the liquid in the container reaches the level of the discharge tube. A movable housing is operatively positioned downstream of a constrictive nozzle giving rise to the venturi and a consequent low pressure area; the movable housing substantially encompasses the low pressure area except that the downstream end of the housing is open and may serve as a discharge tube from which liquid flows into the container to be filled, the filling operation continues until such time as the level of the liquid reaches the level of the discharge tube at which time liquid is rapidly drawn into the low pressure area causing the housing to move in the downstream direction thereby overcoming the restoring force of an associated spring biased valve causing the valve to seat to thereby substantially terminate the flow of liquid.

8 Claims, 6 Drawing Figures

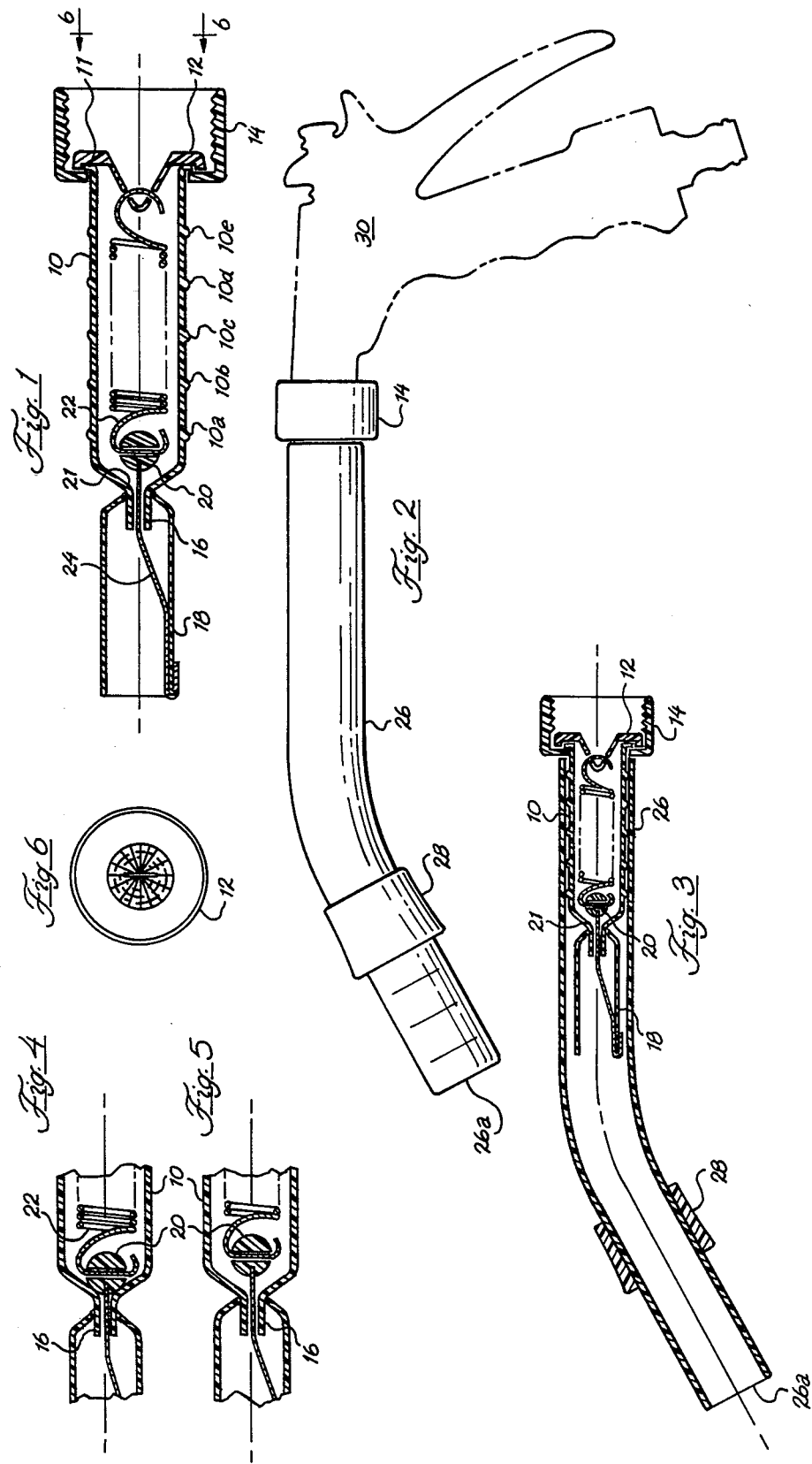

4,556,093

AUTOMATIC SHUTOFF DEVICE

BACKGROUND OF THE INVENTION

The present invention relates to a device for automatically terminating the flow of a liquid into a container when the liquid level in the container being filled completely immerses the end of the discharge tube from whence liquid enters the container being filled. More particularly, the present invention relates to a device suitable for filling electrostorage batteries with an electrolyte, such as water, and to automatically shut off the fluid flow when the liquid in the battery reaches a predetermined level.

FIELD OF THE INVENTION

By reason of the simplicity of construction and unique operating principle, the present invention is particularly suitable to serve as a battery filling device; however, while the invention has particular applicability as an automatic shutoff device for filling batteries, it will be appreciated that the invention has more general application as a shutoff device for controlling the flow of liquid into any container.

DESCRIPTION OF RELATED ART

The automatic shutoff device comprising the present invention is of the type which makes use of a venturi to establish a low pressure area in the liquid flowpath. Normally the container to be filled is open to air at atmospheric pressure such that air can readily enter the discharge tube to equalize the low pressure area developed by the venturi; however, once the output end of the discharge tube is completely immersed in liquid, air can no longer enter the discharge tube, in consequence of which a partial vacuum develops which is used, as in the prior art devices, to trigger the release of a control valve. Such prior art devices mainly evolved as gasoline pump nozzles wherein generally complex mechanisms are used to sense the low pressure condition and thereupon trigger an associated shutoff valve. Such prior art shutoff devices are typically of complex and expensive design and are only suitable for use in a relatively clean environment.

In contrast, the automatic shutoff device comprising the present invention is of such simple yet novel design that it functions perfectly in a relatively contaminated environment and yet by reason of its simplistic design can be inexpensively maintained. The design objectives are dramatically achieved in the present invention by functionally combining the liquid level sensing discharge tube with the low pressure condition responsive mechanism which in turn is connected to valving means positioned in the liquid flowpath such that when the discharge tube becomes completely immersed in liquid it moves causing a valve to seat to substantially terminate the flow of liquid.

It is therefore an object of the present invention to provide an improved device for automatically terminating the flow of a liquid into a container by means of a simplified shutoff valve having substantially fewer components than prior art devices and, as a consequence, producing a shutoff valve which is more economical to manufacture and maintain.

It is a further object of the present invention to provide an automatic shutoff valve for liquids which, by reason of its simplified design, is less likely to be rendered inoperative by reason of the buildup of contaminants and is thus more reliable in operation.

SUMMARY OF THE INVENTION

In accordance with the present invention, liquid exits a pressurized upper chamber by way of a downstream projecting constrictive nozzle attached to which, either slidably or flexibly, is an inverted bell shaped housing. The end of the housing opposite the bell shaped portion is open permitting liquid to pass through the bell shaped housing without effect. The downstream projecting constrictive nozzle also serves as a valve seat against which a spring biased poppet valve is selectively positioned to terminate the flow of liquid through the nozzle and the bell shaped housing. Liquid continues to flow through the nozzle and exits the bell shaped housing into the container to be filled until such time as the liquid level rises so as to completely immerse the downstream end of the bell shaped housing at which time liquid is rapidly drawn into the low pressure area developed inside the bell shaped housing downstream of the constrictive nozzle thereby causing the bell shaped housing to move in the downstream direction thereby covercoming the restoring force of the spring biased poppet valve causing the latter to seat and thereby substantially terminate the flow of liquid.

The simplicity of design which characterizes the present invention results in advantages both in economy of manufacture and operation as well as reliability of performance. More particularly, there are no vacuum pipes, no pistons, no cylinders and no critical tolerances. Since the present invention does not require venting to the atmosphere other than at the point of discharge of the liquid into the container being filled, the device is susceptible for use in conjunction with potentially dangerous fluids.

BRIEF DESCRIPTION OF THE DRAWING

Other benefits and advantages of the present invention will become apparent to one skilled in the art from the following detailed description and claims when read in conjunction with the accompanying drawing wherein:

FIG. 1—is a vertical cross section of the invention taken through its longitudinal axis;

FIG. 2—shows an extended sleeve designed to substantially encompass the automatic shutoff device of FIG. 1. A conventional pistol-shaped water gun is depicted in broken lines in conjunction with the extended sleeve and the automatic shutoff device of FIG. 1;

FIG. 3—is a cross sectional view of the extended sleeve of FIG. 2 and the automatic shutoff device of FIG. 1;

FIG. 4—is a fragmentary longitudinal section of a portion of FIG. 1 depicting the operation of the present invention in which the poppet valve is closed; while FIG. 5—depicts a fragmentary longitudinal section of the automatic shutoff device of FIG. 1 in which the poppet valve is open; and, FIG. 6—is an end view taken along the line 6—6 of FIG. 1.

DESCRIPTION OF THE PREFERRED EMBODIMENT

Referring now in more detail to the drawings, FIG. 1 embodies a preferred form of the invention comprising a tubular member (10) for conducting liquid from a source (not shown). Liquid enters the tubular member

(10) at the input end (11) via a conically shaped perforated baffle (12) positioned within an internally threaded adaptor (14). The liquid exits the tubular member (10) via a discharge port comprising a downstream projecting constrictive nozzle (16). Slidably mounted on the downstream projecting constrictive nozzle (16) is a longitudinally extended housing (18) generally conforming to the shape of a bell which is open at one end and substantially necked down at the other. The necked down end of housing (18) has an orifice of diameter just sufficient to enable it to be slidably mounted in close fitting relationship with the downstream projecting constrictive nozzle (16) of the tubular member (10).

The tubular member (10), the conically shaped perforated baffle (12), the adaptor (14) and the longitudinally extended housing (18) all are preferrably molded of durable plastic and, although depicted in the drawings as though there is some spacial separation between these members, this is for illustrative purposes only. When in use, the tubular member (10), the conically shaped perforated baffle (12) and the adaptor (14) form an airtight-watertight seal with respect to each other. Similarly, the longitudinally extended housing (18) is in substantially airtight relation to the extended nozzle (16) and yet is readily slidable thereon as will be seen from the descriptive explanation of the operation of the present invention which follows.

Inside the tubular member (10), and depicted in cross section, is a spherical ball (20) preferably of plastic material which serves as a poppet valve. The ball (20) becomes seated on a valve seat (21) comprising the output end of the tubular member (10). The poppet valve comprising the ball (20) is normally biased to its open position by means of a stainless steel spring (22), one end of which forms a finger threaded through an opening in the ball (20) while a similar finger at the other end of the spring (22) is threaded through cooperative openings in the conically shaped perforated baffle (12).

An actuator (24) comprising a stainless steel metal rod is connected at one end to the ball (20) and at its other end to the longitudinally extended housing (18). By reason of the tension is spring (22), the ball (20) is retracted from its seating relationship with the outlet end of tubular member (10). At the same time, the tensioning effect of spring (22) is extended via actuator (24) to the housing (18) causing the latter to slide rearward on the downstream projecting constrictive nozzle (16) until it reaches its limit of travel, coming to rest against the inwardly shaped shoulders of the tubular member (10) as is depicted in FIGS. 1, 3 and 5.

Encircling the tubular member (10) are a plurality of raised rings (10a, 10b, 10c, 10d, 10e) designed to provide an airtight fitting for the automatic shutoff valve of FIG. 1 when the latter is inserted in a frictional-fit relationship within an extended sleeve (26). As may be seen from FIG. 3, the extended sleeve (26) is curved toward its midpoint. Thus, liquid projected through the orifice comprising the downstream projecting constrictive nozzle (16) exits with substantial velocity and passes through the longitudinally extended housing (18) in a solid stream and with no effect thereon but impinges on the curved sidewalls of the extended sleeve (26) thereby substantially dissipating the momentum of the liquid before it exits from the discharge end of the sleeve (26).

Slidably mounted on the extended sleeve (26) is a plastic collar (28) which may be selectively positioned near the discharge end of sleeve (26) to serve as a stop for determining the depth of insertion of the output end of the sleeve (26) into a container (not shown) to be filled. Since the present invention is most ideally suited to serve as an automatic shutoff valve for filling batteries, the outer diameter of the extended sleeve (26) is fabricated so as to be smaller than the filler openings of a standard electrostorage battery while the outside diameter of the collar (28) is larger than the filler openings thus ensuring that the output end of the sleeve (26) is inserted to just the desired depth.

The internally threaded adapter (14) is of conventional dimension enabling the automatic shutoff device comprising the present invention to be connected directly to a conventional plastic water hose or, as depicted in FIG. 2, to the nozzle of a pistol-grip water gun of conventional design such as is more completely described in U.S. Pat. No. 3,799,447 (Husky). The Husky patent is representatives of a large variety of such pistol-grip water guns which in turn comprise a spring-biased valve to independently control the flow of water through the gun upon actuation of an associated lever. Since the subject matter of the Husky patent forms no part of the present invention other than to serve as one such control means for selectively initiating the flow of a liquid through the automatic shutoff device comprising FIG. 1, no further description is deemed necessary. As will become apparent from the explanation of operation of the present invention which follows, the pistol-grip water gun may be replaced by a conventional garden hose without affecting the ability of the present invention to serve as an automatic shutoff device for terminating the flow of liquid; however, devices of the type depicted generally in the Husky patent do provide a convenient means for facilitating the resetting of the shutoff valve comprising the present invention thus obviating the need to provide alternative means for interrupting the flow of liquid from the primary source. Selective interruption is needed in order to enable the present invention to work on a cyclical basis.

An explanation of the operation of the automatic shutoff device comprising the present invention will first be given in connection with the preferred embodiment of the device depicted in FIG. 1. Assume that the assembly comprising FIG. 1 is attached to a conventional water hose by way of adaptor (14). As the adaptor (14) is drawn up on the male threaded coupling of the water hose, the inwardly projecting shoulders of adaptor (14) will cooperate with the outwardly flared shoulders comprising the output end (11) of tubular member (10) and the conically shaped perforated baffle (12) to provide a watertight seal at the juncture of members (11), (12) and (14). Assume now that the water hose with the automatic shutoff device of FIG. 1 attached thereto is inserted into a container to be filled such that the housing (18) descends to the desired level. Although the present invention is ideally suited for filling an electrostorage battery, the container may be a swimming pool, in which event the automatic shutoff device comprising FIG. 1 will be vertically suspended in the pool and the water supply turned on with the expectation that the automatic shutoff valve will become operative to terminate the flow of water when the level of the water in the pool rises to the point where the discharge end of thr longitudinally extended housing (18) becomes completely immersed in water.

To understand the operation of the preferred embodiment of the invention in such situation, assume that the water supply is actuated such that water flows into the tubular member (10) via the conically shaped perforated baffle (12). As such, water flows past the stainless steel spring (22) which acts to withdraw ball (20) from seat (21) thereby enabling the water to exit tubular member (10) via the downstream projecting constrictive nozzle (16). The velocity of the water exiting from the nozzle (16) is such that there is substantially no divergence, the water exiting in a solid stream without effect on the longitudinally extended member (18). Nor does the actuator (24) act to disburse the exiting stream of water or result in any substantial drag effect.

The jet of water exits the constrictive nozzle (16) at a substantial velocity. In the arrangement of FIG. 1 wherein the components are depicted on a one-for-one scale, and where water exits from the nozzle at the rate of two to three gallons per minute, the velocity of the jet measured at this nozzle is approximately 88 feet per second. These measurements were taken in a system in which water was supplied to the automatic shutoff valve of FIG. 1 at a pressure of approximately 60 pounds per square inch. A reaction force of approximately 1 pound was recorded in conjunction with the arrangement depicted in FIG. 1 and with the aforementioned operative parameters. The presence of the reaction force is most noticeable when the automatic shutoff valve of FIG. 1 becomes operative to substantially terminate the flow of the water therefrom. It is this force differential which is in turn responsible for the very positive and determinative action which characterizes the operation of the present invention. More specifically, the substantial momentum represented by the jet of water exiting the nozzle (16) is effectively transferred to the longitudinally extended housing (18) causing the housing to ride forward on the constrictive nozzle (16) and in turn causing the poppet valve (20) to become seated at (21). The existence of the force differential which characterizes the two operative states of the subject automatic shutoff valve can be dramatically demonstrated by removing the ball from the apparatus depicted in FIG. 1 and connecting the actuator (24) directly to the spring (22) so as to permit the housing (18) to ride on the constrictive nozzle (16) without termination of the flow of liquid through the device. If now this modified version of the device is connected to a source of water under pressure, a well-defined stream of water will exit from nozzle (16) and will further exit the housing (18) without noticeable divergence. At the same time, a measurable reaction force is noted as the stream of water exits the discharge end of the longitudinally extended housing (18). If now the modified apparatus under consideration is entirely submerged in water, the exit velocity of the stream of water emerging from the discharge end of the longitudinally extended housing (18) will have been substantially reduced and there is a corresponding reduction in the reaction force. This substantial change in reaction force from a measured value of approximately one pound to a small fraction of this can only be accounted for in terms of there having occurred a substantial reduction in the momentum of the jet emanating from nozzle (16). The momentum of the jet has been largely dissipated. It will be noticed that even in this modified version of the apparatus (i.e. FIG. 1 without the ball [20]) the longitudinally extended housing moves in the downstream direction on the downstream projecting constrictive nozzle (16). In both the modified version of the apparatus and the preferred embodiment of the automatic shutoff valve comprising FIG. 1, a low pressure area exists just downstream of the output end of the constrictive nozzle (16) during such time as liquid is being ejected from said nozzle (16) in substantially a solid jet. At such time air enters the longitudinally extended housing (18) at the discharge end thereof tending to equalize the low pressure area. At such time as the discharge end of the longitudinally extended housing (18) is completely immersed in liquid, air can no longer enter the housing as a consequence of which a partial vacuum exists in proximity to said nozzle (16). Since nature abhors a vacuum, the bell shaped housing is induced to slide forward on the constrictive nozzle (16) at the same time as water rushes into the longitudinally extended housing (18) from the discharge end thereof to remove the void caused by the partial vacuum. It is in consequence of the fact that the bell shaped housing (18) moves in the downstream direction on the constrictive nozzle (16) that the ball (20) is seated against seat (21). Once the ball (20) is seated, it remains seated by reason of the substantial water pressure being exerted thereon from the source not shown.

The addition of the extended sleeve (26) to the device depicted in FIG. 1 does nothing to modify the operation of the latter except that when water rises to the level of the downstream end (26a) of the extended sleeve (26) air can no longer reach the low pressure area created at the output of constrictive nozzle (16) as a consequence of which the partial vacuum formed thereat causes liquid to be pulled up into the extended sleeve (26) and it is only when it rises to such level that the output end of the longitudinally extended housing (18) is completely immersed in liquid that housing (18) moves forward causing the ball (20) to be seated on seat (21).

In further explanation of the principle of operation of the present invention, it has been noted that the reaction force which is so dramatically evident when the solid jet of water is exiting the constrictive nozzle (16), is largely dissipated when the output end of the longitudinally extended housing (18) becomes completely immersed in liquid. If now the reaction force ($F_1$) is defined as being a function of mass flow and velocity $mV_1$), then there must exist a second force resulting in the dissipation of momentum of the jet when housing (18) becomes immersed in liquid. The magnitude of such second force is:

$$\dot{m}(V_1 - V_2)$$

which force acts on the housing (18) in the direction of fluid flow. The force acting on the bell shaped housing is independent of bell diameter unlike the piston and diaphragm system comprising the prior art. It has been found that any bell shaped housing which adequately dissipates momentum will suffice as long as it (a) has an adequate base of reaction (i.e. an open tube will not work); (b) does not leak its vacuum excessively; and (c) does not choke itself up in air.

Consideration is now given to the combination comprising the automatic shutoff valve depicted of FIG. 3 and the pistol-grip, water gun (30) of FIG. 2. As indicated above, the water gun (30) forms no part of the present invention; however, when used in combination with the present invention, it provides an ideal device for repetitively delivering limited quantities of a liquid and automatically terminating the flow of liquid during each such cycle at such time as the liquid in the container being filled rises to the level of the discharge tube (26a) of the extended sleeve (26). The feature which distinguishes the operation of the automatic shutoff valve of FIG. 1, when connected to a continuous supply of liquid under pressure (e.g. the water hose considered in the aforementioned explanation of operation of FIG. 1) from the apparatus depicted generally in FIG. 2, concerns the performance of the ball valve (20) in the two different embodiments under consideration. In the embodiment of FIG. 1 after housing (18) has moved in the downstream direction thereby seating ball (20) on seat (21) to substantially terminate the flow of liquid through the nozzle (16), ball (20) remains seated as long as the ball continues to be exposed to the liquid under pressure. In contrast, the pistol-grip water gun (30) is characterized by a relatively short delivery cycle in which water is only delivered through the gun so long as the pistol grip is depressed. Actuation of the gun (30), when the latter is connected to a source of water under pressure, results in the operation of the automatic shutoff device comprising the present invention in the manner presented above in explanation of the operation of FIG. 1, as a consequence of which a solid jet of water exits the discharge end of the longitudinally extended housing (18) and thereafter impinges on the curved sidewall of the extended sleeve (26) thereby reducing the momentum of the fluid delivered at the discharge end (26a) of the extended sleeve (26). The diameter of the orifice at the discharge end of the extended sleeve (26) is sufficient to accommodate the flow of liquid without choking off the air supply which enters the sleeve (26) at the discharge end (26a) to neutralize the low pressure area created at the output of the nozzle (16).

Improper dimensioning of the extended sleeve (26) could cause liquid to choke up in the tube thus prematurely terminating the influx of neutralizing air causing the bell shaped housing (18) to move in the downstream direction, seating ball (20) and thereby substantially terminating the flow of liquid.

Continuing now with an explanation of the combination depicted in FIG. 2, water continues to be delivered from the discharge end of the extended sleeve (26) as long as the gun (30) remains actuated or until liquid in the container being filled rises to a level such that the discharge end (26a) of the extended sleeve (26) is completely immersed in liquid at which time air can no longer enter the sleeve (26) to neutralize the low pressure zone created at the output of nozzle (16). At this time a partial vacuum builds up in the region just downstream of the output end of nozzle (16) causing water to be rapidly pulled up the inside of the extended sleeve (26) until such time as it reaches the discharge end of the longitudinally extended housing (18) whereupon the housing moves in the downstream direction seating ball (20) on seat (21) and substantially terminating the flow of fluid. The operator of the water gun (30) will sense the termination of flow by reason of the dramatic change in reaction force which has been explained in detail above. By releasing his grip on the gun (30), the operator cuts off the source of fluid pressure tending to retain ball (20) seated against seat (21). Even if this constitutes only a momentary interruption, it is generally sufficient to enable residual liquid trapped in the tubular member (21) to leak past the ball (20) and nozzle (16) thereby permitting spring (22) to restore the longitudinally extended housing (18) to its reset position. The combination depicted in FIG. 2 is then ready to commence a new filling cycle.

While the apparatus depicted in the drawings represents a preferred embodiment of the invention, it will be obvious to those skilled in the art that modifications can be readily made to the various components without deviating from the basic principle of operation. In this respect, the functional equivalent of tubular member (10), baffle (12) and adaptor (14) may be readily extruded of plastic or similar material as a single component which includes the constrictive nozzle (16). Similarly, in certain applications, it may be desirable to abbreviate the length of the extended sleeve (26) and combine it as part of the aforementioned singularly extruded equivalent of members (10), (12) and (14). Other equivalent embodiments will become readily apparent, including the replacement of the relatively stiff stainless steel actuator rod (24) with a threadlike material possibly of "plastic" or similar non-reactive substance. While these and other equivalent implementations may be readily suggested to those skilled in the art, they should not be construed as limiting and particularly when giving interpretation to the appended claims.

What is claimed:

1. An automatic shutoff device for controlling the flow of liquid flowing in a downstream direction comprising an extended sleeve having an upstream end and a downstream end, said extended sleeve directing said liquid flowing in said downstream direction into a container to be filled;

a tubular member within said extended sleeve, said tubular member further comprising an input end and an output end, said input end of said tubular member being flared outwardly;

an adaptor, one end portion of which is internally threaded, the other end portion of said adaptor being inwardly flared such that when said tubular member is inserted within said adaptor the outwardly flared portion of said tubular member cooperatively rests on the inwardly projecting end portion of said adaptor;

a conically shaped perforated baffle positioned within said adaptor such that said conically shaped perforated baffle projects into said tubular member from the input end thereof;

the output end of said tubular member further comprising a downstream projecting constrictive nozzle having an orifice of substantially reduced cross section relative to the cross section of said input end of said tubular member, said output end of said tubular member further comprising a valve seat;

a ball operatively positioned within said tubular member and in proximity to said output end thereof to enable said ball to serve as a valve for substantially terminating the flow of fluid from the source of fluid supply;

a spring connected at one end to said ball and at the other end to said baffle, said spring normally biasing said valve to its open position;

a longitudinally extended housing one end of which is open and of substantially larger diameter than the diameter of said downstream projecting constrictive nozzle, the other end of said longitudinally extended housing comprising an opening of reduced cross section relative to the cross sectional diameter of said tubular member so as to enable said longitudinally extended housing to be mounted on said downstream projecting constrictive nozzle and slidably movable thereon;

an actuator comprising a relatively stiff rodlike member connected at one end to said ball and projecting through said downstream projecting constrictive nozzle, said actuator being attached at its other end to said longitudinally extended housing;

whereby, when selectively actuated, fluid flows from a fluid supply source into said automatic shutoff device via said adaptor past said baffle and into said tubular member via said input end, around said spring and ball, said fluid thereafter passes out said downstream projecting constrictive nozzle at substantial velocity and follows a conforming path defined by said extended sleeve into the container to be filled, such flow continues until such time as the fluid level within the container rises to a level which completely immerses the downstream end of said extended sleeve whereby a negative pressure area is formed at the orifice of the downstream projecting constrictive nozzle in consequence of which liquid flows into said extended sleeve and immerses the end of said longitudinally extended housing causing said housing to move in the downstream direction causing said ball to seat on said valve seat thereby substantially terminating the flow of fluid through said device.

2. A liquid level automatic shutoff device comprising a tubular member defining a fluid flowpath, said tubular member having an input end and an output end, said output end of said tubular member further comprising a constrictive nozzle projecting in the downstream direction of fluid flow, said constrictive nozzle having an orifice of substantially reduced cross section relative to the cross section of said input end of said tubular member, valving means positioned in said fluid flowpath, said valving means being normally biased to the open position, said valving means further comprising means selectively operative to substantially terminate the flow of fluid along said fluid flowpath, actuating means attached at one end to said valving means and extending through said orifice, a longitudinally extended member having an open end of substantially the same cross sectional diameter as the input end of said tubular member, the other end of said longitudinally extended member having an opening of substantially reduced cross section enabling said longitudinally extended member to be slidably positioned on said projection and in close fitting relation thereto, whereby fluid flows through said fluid flowpath so long as said open end of said longitudinally extended member is exposed to a gaseous medium at a positive pressure as a consequence of which said normally open valving means remains open, and at such time as said open end of said longitudinally extended member becomes immersed in liquid said longitudinally extended member slides on said projection in said downstream direction of fluid flow causing said valving means to become selectively operative to thereby substantially terminate the flow of fluid along said flowpath.

3. A liquid-level responsive automatic shutoff valve, comprising:

a tubular member defining a fluid flowpath, said tubular member having an input end and an output end, said output end of said tubular member further comprising a projection axially extending in the direction of said fluid flowpath, said projection further comprising a constrictive opening of substantially reduced diameter relative to the diameter of said input end of said tubular member;

valving means positioned in said fluid flowpath, said valving means having an open portion and a closed portion, said valving means being normally biased to its open position, said valving means when biased to said closed position substantially terminating the flow of fluid through said constrictive opening;

actuating means attached at one end to said valving means and extending through said constrictive opening;

a longitudinally extended member one end of which comprises an open end of substantially larger diameter than the diameter of said constrictive opening, said longitudinally extended member further comprising another end, said another end comprising an opening of reduced cross section so as to enable said longitudinally extended member to be slidably positioned on said projection in substantially airtight relationship thereto;

said actuator being further attached to said longitudinally extended member;

whereby, so long as said open end of said longitudinally extended member is exposed to a gaseous medium at a positive pressure said valving means remains biased in said open position permitting fluid to enter said tubular member and to flow along said fluid path and be exhausted at substantial velocity through said open end of said longitudinally extended member, which flow continues until such time as said open end of said longitudinally extended member becomes completely immersed in liquid at which time a negative pressure area develops within said longitudinally extended member causing said another end of said longitudinally extended member to slidably move on said projection thereby causing said valving means to move to said closed position to thereby terminate the flow of fluid through said constrictive opening.

4. A liquid level responsive automatic shutoff valve comprising, a tubular member defining a fluid flowpath, a valve seat positioned within said fluid flowpath, a downstream projection comprising a constrictive opening in said fluid flowpath, said constrictive opening being of substantially smaller diameter than the diameter of said tubular member, a normally open valve operatively positioned with respect to said valve seat, said valve capable of being selectively moved into closed position with respect to said valve seat, an actuator projecting through said constrictive opening, a longitudinally extended housing, said longitudinally extended housing being bell-shaped at one end and having an annular opening at the bell-shaped end of said longitudinally extended housing, said annular opening being of substantially the same cross sectional diameter as the external diameter of the projection comprising said constrictive opening such that said annular opening of said end of said longitudinally extended housing may be slidably positioned on said projection, said actuator having a first end and a second end, the first end of said actuator being attached to said valve and the second end of said actuator being attached to said longitudinally extended housing.

5. A valving device comprising a fluid conducting member having an inlet port and a discharge port, said discharge port terminating in a downstream projecting constrictive nozzle forming a venturi, said discharge port further comprising a valve seat, a normally open valve operatively positioned to cooperate with said valve seat, a tubular housing, having an upstream end and a downstream end, movably mounted with respect to said constrictive nozzle, the upstream end of said tubular housing reduced in section to substantially enclose said constrictive nozzle, said upstream end of said tubular housing terminating in substantially airtight contact with said constrictive nozzle, the downstream end of said tubular housing being open, and an actuator mechanically connecting said tubular housing to said valve.

6. A valving device as set forth in claim 5 in which said tubular housing comprises a member having a bell-shaped end and having an orifice at the bell-shaped end thereof enabling said housing to be slidably mounted with respect to said nozzle.

7. A valving device as set forth in claim 5 in which said tubular housing is flexibly secured to said downstream projecting nozzle.

8. A valving device as set forth in claim 5 in which said valve further comprises a ball connected at one end to a spring under tension.

* * * * *